(12) United States Patent
Sedenka

(10) Patent No.: US 10,696,202 B2
(45) Date of Patent: Jun. 30, 2020

(54) PNEUMATIC DEVICE AND METHOD FOR MANUFACTURING THE SAME

(71) Applicant: Continental Automotive GmbH, Hannover (DE)

(72) Inventor: Jan Sedenka, Ostrava (CZ)

(73) Assignee: Continental Automotive GmbH, Hannover (DE)

( * ) Notice: Subject to any disclaimer, the term of this patent is extended or adjusted under 35 U.S.C. 154(b) by 127 days.

(21) Appl. No.: 16/147,988

(22) Filed: Oct. 1, 2018

(65) Prior Publication Data
US 2019/0106040 A1 Apr. 11, 2019

(30) Foreign Application Priority Data

Oct. 10, 2017 (GB) .................................. 1716543.2

(51) Int. Cl.
| | |
|---|---|
| *A47C 3/00* | (2006.01) |
| *B60N 2/90* | (2018.01) |
| *B29C 65/00* | (2006.01) |
| *B29D 22/02* | (2006.01) |
| *B60N 2/70* | (2006.01) |

(52) U.S. Cl.
CPC .............. *B60N 2/914* (2018.02); *B29C 65/00* (2013.01); *B29D 22/02* (2013.01); *B60N 2/7017* (2013.01)

(58) Field of Classification Search
CPC ... B60N 2/914; B60N 2/976; B29L 2031/771; A61H 9/0078; A61H 2201/0103; A61H 2201/0149; A61H 2201/5071; A61H 9/005; A61H 9/00
USPC ......... 297/284.6, 284.4, 284.2, 284.3, 284.1, 297/DIG. 3, DIG. 8; 5/713; 383/3
See application file for complete search history.

(56) References Cited

U.S. PATENT DOCUMENTS

| | | | | |
|---|---|---|---|---|
| 3,326,601 A | * | 6/1967 | Parkinson | A47C 4/54 297/284.6 |
| 4,444,430 A | * | 4/1984 | Yoshida | A47C 7/467 297/284.6 |
| 4,634,179 A | * | 1/1987 | Hashimoto | A47C 7/467 297/284.3 |
| 5,076,643 A | * | 12/1991 | Colasanti | A47C 7/467 297/284.6 |
| 5,082,326 A | | 1/1992 | Sekido et al. | |

(Continued)

OTHER PUBLICATIONS

Combined Examination and Search Report for GB Application No. 1716543.2, dated Mar. 19, 2018, 2 pages.

*Primary Examiner* — Chi Q Nguyen
(74) *Attorney, Agent, or Firm* — RatnerPrestia

(57) ABSTRACT

A pneumatic device for adjusting a contour of a seating face of a vehicle seat is disclosed. The pneumatic device includes a first foil; a second foil arranged on the first foil; a third foil arranged on the second foil; a first seam connecting the first foil, the second foil and the third foil to one another, wherein the first seam is configured to provide a first fluid chamber between the first foil and the second foil, a second fluid chamber between the second foil and the third foil, and wherein the first fluid chamber and/or the second fluid chamber are configured to adjust the contour of the seating face of the vehicle seat. The pneumatic device further includes a connection passage formed in the second foil and configured to fluidly connect the first fluid chamber with the second fluid chamber.

19 Claims, 11 Drawing Sheets

(56) References Cited

U.S. PATENT DOCUMENTS

| | | | | |
|---|---|---|---|---|
| 5,135,282 A * | 8/1992 | Pappers | B60N 2/914 | 297/284.3 |
| 5,558,398 A * | 9/1996 | Santos | A47C 4/54 | 297/284.3 |
| 5,713,631 A * | 2/1998 | O'Neill | A47C 4/54 | 297/284.6 |
| 6,126,152 A * | 10/2000 | Santos | F16F 9/04 | 267/118 |
| 6,129,419 A * | 10/2000 | Neale | B60N 2/58 | 297/284.4 |
| 6,203,105 B1 * | 3/2001 | Rhodes, Jr. | A47C 4/54 | 297/284.6 |
| 6,551,450 B1 * | 4/2003 | Thomas | A61H 9/0078 | 156/580.1 |
| 6,916,300 B2 * | 7/2005 | Hester | A61H 23/04 | 297/284.6 |
| 8,162,398 B2 * | 4/2012 | Colja | A61H 9/0078 | 297/284.4 |
| 9,725,177 B2 * | 8/2017 | John | A47C 27/10 | |
| 10,214,129 B2 * | 2/2019 | Jaranson | B60N 2/914 | |
| 10,363,852 B2 * | 7/2019 | Strumolo | B60N 2/99 | |
| 10,406,063 B2 * | 9/2019 | Mitchell | A61H 23/006 | |
| 2006/0085919 A1 * | 4/2006 | Kramer | A47C 27/082 | 5/713 |
| 2006/0217644 A1 * | 9/2006 | Ozaki | A61H 9/0078 | 601/148 |
| 2008/0080793 A1 * | 4/2008 | Kitou | A61H 9/0078 | 383/3 |
| 2010/0031449 A1 * | 2/2010 | Cheng | A61H 9/0078 | 5/713 |
| 2010/0207443 A1 * | 8/2010 | Brncick | B60N 2/686 | 297/452.48 |
| 2011/0203589 A1 * | 8/2011 | Fenton | A61M 16/0072 | 128/205.13 |
| 2011/0227388 A1 * | 9/2011 | Bocsanyi | B60N 2/914 | 297/452.41 |
| 2015/0025425 A1 * | 1/2015 | Mitchell | A61H 1/008 | 601/96 |
| 2016/0200228 A1 | 7/2016 | Saren et al. | | |

* cited by examiner

A-A

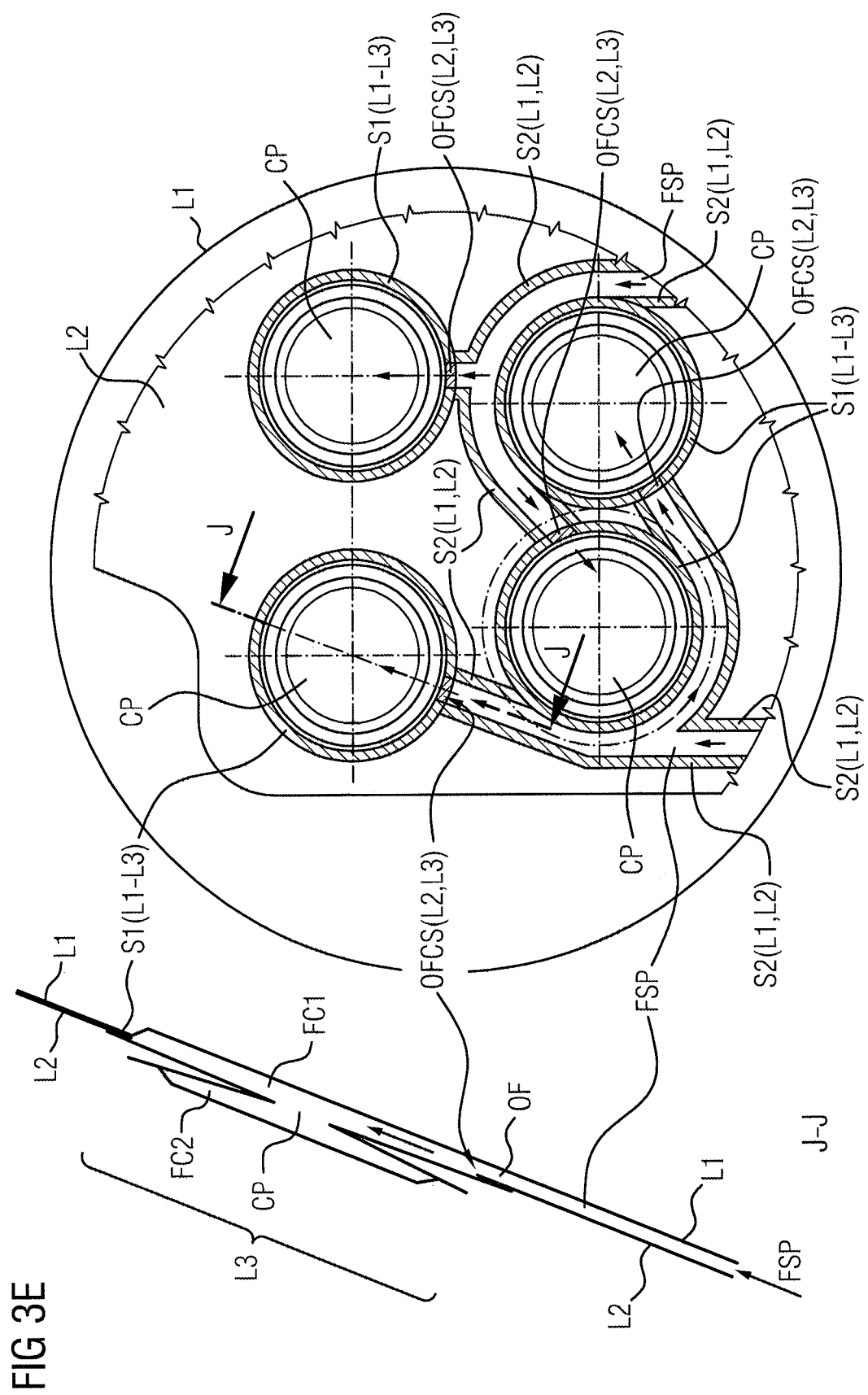

PNEUMATIC DEVICE AND METHOD FOR MANUFACTURING THE SAME

CROSS REFERENCE TO RELATED APPLICATIONS

This application claims priority to Great Britain Patent Application No. 1716543.2, filed Oct. 10, 2017, the contents of such application being incorporated by reference herein.

FIELD OF THE INVENTION

The present invention relates to a pneumatic device for adjusting a contour of a seating face of a vehicle seat. The present invention further relates to a vehicle seat including such a pneumatic device as well as to a method for manufacturing a pneumatic device for adjusting a contour of a seating face of a vehicle seat.

BACKGROUND OF THE INVENTION

Modern vehicle seats include fluid cells or chambers which are inflated by providing pressurized fluid such as pressurized air to the fluid cells. These fluid cells are arranged in the region of a sitting face or a backrest face (together termed seating face) of the vehicle seat. By providing pressurized fluid to the fluid cells, a volume of a respective fluid cell increases which makes it possible to adjust a contour of the seating face of the vehicle seat in the region of the respective fluid cell. For providing the pressurized fluid to the respective fluid cell, the fluid such as air is first pressurized using for example a compressor and then distributed to the respective fluid cell using a network of fluid lines (e.g. plastic tubes), valves and a control device for controlling the valves.

These fluid cells are typically produced by arranging multiple foils such as plastic foils on top of each other and connecting pairs of these foils along welding seams. The arrangement of the welding seams is highly complex and requires a lot of manufacturing steps and manual work until the fluid cells are produced.

SUMMARY OF THE INVENTION

An aspect of the present invention aims to provide a pneumatic device for adjusting a contour of a seating face of a vehicle seat which can be manufactured in a cost effective and time efficient manner.

According to a first aspect of the present invention, a pneumatic device for adjusting a contour of the seating face of a vehicle seat is provided. The pneumatic device comprises a first foil, a second foil arranged on the first foil, a third foil arranged on the second foil, a first seam connecting the first foil, the second foil and the third foil to one another, the first seam being configured to provide a first fluid chamber between the first foil and the second foil, the first seam being further configured to provide a second fluid chamber between the second foil and the third foil, wherein the first fluid chamber and/or the second fluid chamber are configured to adjust the contour of the seating face of the vehicle seat. The pneumatic device further comprises a connection passage formed in the second foil and configured to fluidly connect the first fluid chamber with the second fluid chamber. By providing the first seam that connects the first foil, the second foil and the third foil to one another, the manufacturing steps for manufacturing the pneumatic device can be significantly decreased and time and money for producing the pneumatic device can be saved.

According to an embodiment of the pneumatic device, the pneumatic device further comprises a second seam connecting only the first foil and the second foil to one another, the second seam being configured to provide a fluid supply passage between the first foil and the second foil to fluidly connect the first fluid chamber with a fluid source of the pneumatic device. With this embodiment, a fluid supply passage is already integrated into the pneumatic device such that no separate fluid lines in the form of plastic tubes are necessary for providing the pressurized fluid to the first fluid chamber. With this embodiment, manufacturing steps for providing the pneumatic device can be further reduced. Moreover, it is possible to provide a comfortable and thin pneumatic device which does no longer use bulky and uncomfortable plastic tubes as fluid lines.

According to another embodiment, in an inflated state of the second fluid chamber, the second fluid chamber extends substantially along a fluid chamber axis extending along an inflation direction of the second fluid chamber and the connection passage extends through the second foil along a connection passage axis extending substantially parallel to the fluid chamber axis. In a preferred embodiment, the connection passage axis and the fluid chamber axis extend along a common axis. In this preferred embodiment, the spatial extension of the pneumatic device can be further reduced and a more compact pneumatic device can be provided. It is also conceivable that the connection passage axis extends at a predetermined offset to the fluid chamber axis.

In another embodiment, in the inflated state of the second fluid chamber, the second fluid chamber includes a seat contour adjustment portion configured to adjust the contour of the seating face of the vehicle seat and a fluid chamber coupling portion configured to fluidly connect the connection passage to the seat contour adjustment portion. In this embodiment, the second fluid chamber comprises to two distinct portions one for adjusting the contour of the seating face and one for fluidly connecting the connection passage to the seat contour adjustment portion. By providing these two distinct portions, a design of the second fluid chamber can be tailored such that the contour of the seating face of the vehicle seat can be adjusted more precisely.

In a preferred embodiment, in the inflated state of the second fluid chamber, the seat contour adjustment portion extends along a seat contour adjustment portion axis, the connection passage extends along a connection passage axis, wherein the connection passage axis extends at a predetermined offset to the seat contour adjustment portion axis and wherein the predetermined offset is chosen to be larger than a maximal radius of the seat contour adjustment portion. In this embodiment, the connection passage and the seat contour adjustment portion are spaced apart by more than a maximal radius of the seat contour adjustment portion (measured perpendicular to the seat contour adjustment portion axis). In other words, the offset is larger than half a maximal diameter of seat contour adjustment portion. In this arrangement, because the offset is larger than half a maximal diameter of seat contour adjustment portion, the connection passage is spaced apart far enough from the seat contour adjustment portion so that an influence of the seat contour adjustment portion to the connection portion can be minimized.

In another embodiment, the second foil comprises a lower foil (may be also termed first foil layer) and an upper foil (may be also termed second foil layer) arranged on the lower foil, the lower foil and the upper foil include a common opening, only the lower foil and the upper foil are connected to one another by a third seam extending circumferentially around the common opening, and the lower foil, the upper foil, the first foil and the third foil are connected to one another by the first seam extending at least partially circumferentially around the third seam. In this embodiment, the second foil comprises two foil layers, namely the first foil layer and the second foil layer which include a common opening, and a third seam extends circumferentially around the common opening such that the common opening in the first and second foil layers functions as the connection passage.

In another embodiment, the second foil comprises a lower foil (may be also termed first foil layer) and an upper foil (may be also termed second foil layer) arranged on the lower foil, the lower foil, the upper foil, the first foil and the third foil are connected to one another by the first seam, only the lower foil and the upper foil are connected to one another by a third seam arranged adjacent the first seam, and only the first foil and the third foil are connected to one another by a fourth seam arranged offset to the third seam such that an opening extending between the third seam and the fourth seam is provided and configured as the connection passage. In this embodiment, the connection passage is not provided as a common opening in the first and second foil layers but is provided as the space between the third seam and the fourth seam. As in this embodiment no common opening needs to be formed in the first and second foil layer, the manufacturing steps for manufacturing the connection passage can be reduced further.

In another embodiment, the third foil includes an opening in the region of the second fluid chamber, the opening being configured to provide a fluid passage between the second fluid chamber and a third fluid chamber which is formed by connecting a further foil to the third foil. In this embodiment, a further fluid chamber can be added to the second fluid chamber by connecting a further foil (such as a fourth or a fifth foil) to the third foil. By providing a further fluid chamber, an increased adjustment of the contour of the seating face of the vehicle can be provided without overly complicating the manufacturing process.

According to a second aspect of the present invention, a vehicle seat is provided. The vehicle seat includes a seating face for a user of the vehicle seat and a pneumatic device according to the first aspect and its embodiments.

According to a third aspect of the present invention, a method for manufacturing a pneumatic device for adjusting a contour of a seating face of a vehicle seat is provided. The method comprises the steps of providing a first foil, providing a second foil formed with a connection passage, providing a third foil, arranging the second foil on the first foil, arranging the third foil on the second foil, and connecting the first foil, the second foil and the third foil to one another by a first seam such that a first fluid chamber is formed between the first foil and the second foil, such that a second fluid chamber is formed between the second foil and the third foil and such that the first fluid chamber and the second fluid chamber of fluidly connected to one another by the connection passage. With this method, a pneumatic device comprising three foils can be manufactured in a time efficient and effective manner.

In an embodiment of the method, the step of providing a second foil formed with a connection passage further comprises providing the second foil and forming the connection passage inside the second foil. For example, the connection passage can be formed by an opening or a hole inside the second foil.

In another embodiment, only the first foil and the second foil are connected to one another by a second seam such that a fluid supply passage between the first foil and the second foil is formed. In this embodiment, the second seam creates a fluid supply passage between the first foil and the second foil such that separate fluid lines in the form of plastic tubes are no longer necessary.

In another embodiment, the second foil includes a lower foil (first foil layer) and an upper foil (second foil layer) and the step of providing a second foil formed with a connection passage further comprises arranging the upper foil on the lower foil, forming a common opening in the upper foil and the lower foil, and connecting only the upper foil and the lower foil to one another by a third seam extending circumferentially around the common opening. In this embodiment, the connection passage is formed by an opening in the first and second foil layer. Moreover, the third seam extends circumferentially around the common opening so that fluid can only flow through the common opening and does not leak radially out from the common opening into a space between the first and second foil layers.

In a preferred embodiment, the step of connecting the first foil, the second foil and the third foil to one another further comprises connecting the first foil, the lower foil, the upper foil and the third foil to one another by the first seam such that the first seam extends at least partially circumferentially around the third seam. In this embodiment, the first seam connects the first foil, the lower foil and the upper foil (which together form the second foil) and the third foil to one another. Moreover, the first seam extends at least partially circumferentially around the third seam (which seals the connection passage radially) so that pressurized fluid can only flow from the first fluid chamber (between the first foil and the lower foil) via the connection passage (that is the common opening in the lower foil and the upper foil) to the second fluid chamber (between the upper foil and the third foil).

In another embodiment, the second foil includes a lower foil (first foil layer) and an upper foil (second foil layer) and the step of providing a second foil formed with a connection passage further comprises arranging the upper foil on the lower foil, connecting only the upper foil and the lower foil to one another by a third seam, and connecting only the first foil and the third foil to one another by a fourth seam arranged offset to the third seam such that an opening that extends between the third seam and the fourth seam is configured as the connection passage. In this embodiment, the connection passage is not formed as a common opening in the upper foil and the lower foil but as an opening extending between the third seam (which only connects the upper foil and the lower foil) and the fourth seam (which only connects the first foil and the third foil). This further reduces manufacturing complexity.

According to another embodiment, the steps of providing the first foil, providing the second foil and providing the third foil together include the steps of providing a single foil with a first section, a second section and a third section, and folding the single foil along a first folding line and along a second folding line such that the second section lies on the first section and such that the third section lies on the second section. In this embodiment, instead of providing three separate foils, a single foil with three sections is provided and the single foil is folded such that, after folding of the single foil, three layers of foil are arranged on top of each other. With this embodiment, the manufacturing steps for manufacturing the pneumatic device can be further decreased.

Exemplary embodiments of the pneumatic device are considered to be applicable to the method for manufacturing the pneumatic device and vice versa.

BRIEF DESCRIPTION OF THE DRAWINGS

Exemplary embodiments of aspects of the invention are described by the accompanying drawings, which are incorporated herein and constitute a part of the specification. In the drawings:

FIGS. 3A-3E illustrate schematic manufacturing steps for manufacturing the first embodiment of a pneumatic device of FIGS. 1 and 2;

DETAILED DESCRIPTION OF THE PREFERRED EMBODIMENTS

In the following, embodiments of pneumatic devices used for adjusting a contour of a seating face of a vehicle seat are explained. Of course, the explained embodiments of pneumatic devices can also be used in other applications.

Figure 1:
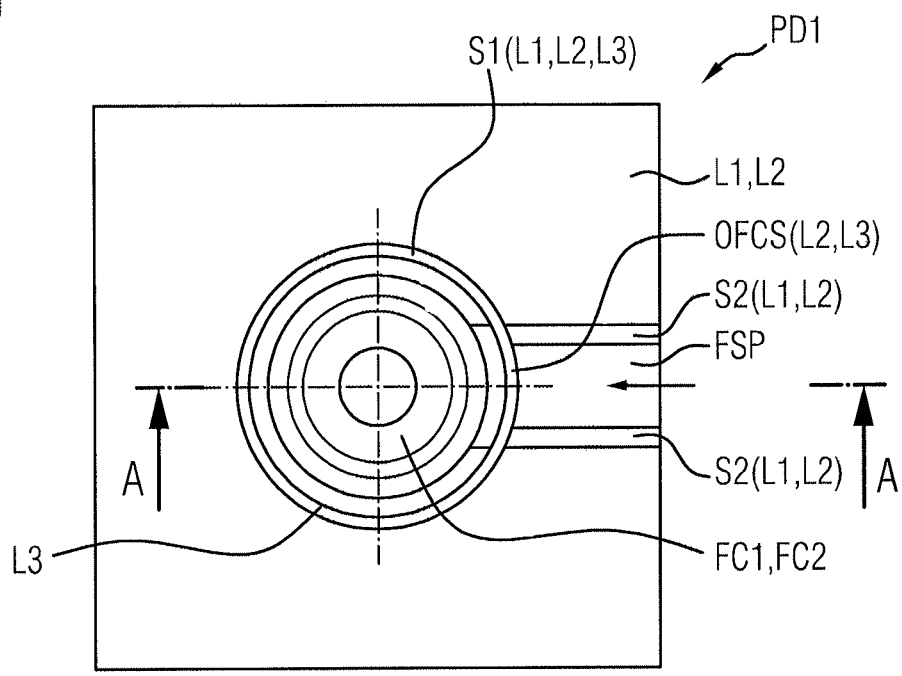
FIG. 1 is a schematic top view of a first embodiment of a pneumatic device according to an aspect of the invention.

FIG. 1 shows a schematic top view of a first embodiment of a pneumatic device PD1. Pneumatic device PD1 includes a first foil L1, a second foil L2 arranged on first foil L1 and a third foil L3 arranged on second foil L2. First foil L1, second foil L2 and third foil L3 are connected to one another by a first seam S1. As will be explained in connection with FIG. 2. First seam S1 is further configured to provide a first fluid chamber FC1 between first foil L1 and second foil L2, and a second fluid chamber FC2 between second foil L2 and third foil L3.

First foil L1 and second foil L2 are further connected to one another by a second seam S2 arranged adjacent first seam S1. Second seam S2 is configured to provide a fluid supply passage FSP between first foil L1 and second foil L2. As will be explained in connection with FIG. 2. Fluid supply passage FSP is further configured to fluidly connect first fluid chamber FC1 with a fluid source FS (see FIGS. 4D and 5D) of pneumatic device PD1.

A further seam, also called an overflow connection seam OFCS, connects second foil L2 with third foil L3 and is arranged between first seam S1 and second seam S2.

Figure 2:
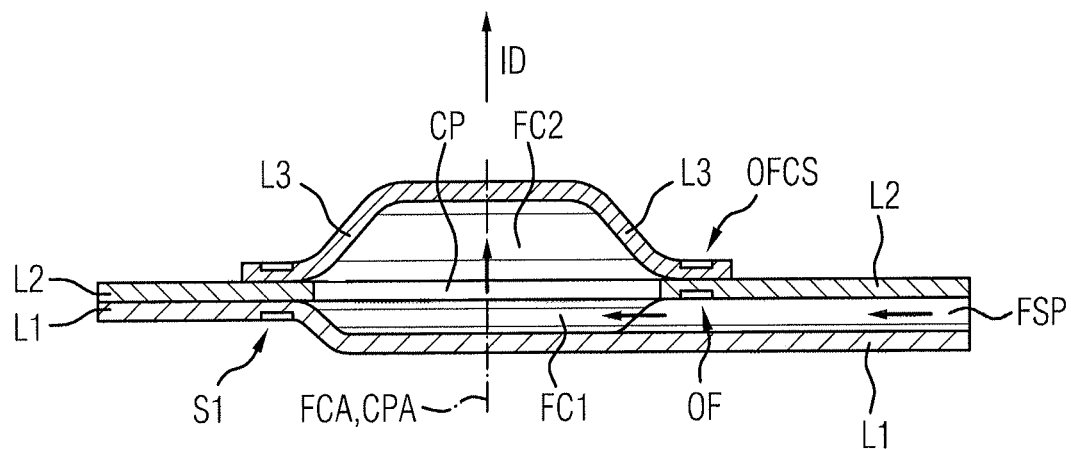
FIG. 2 is a schematic cross-sectional view of the first embodiment of FIG. 1 taken along line A-A of FIG. 1.

Referring now to FIG. 2, FIG. 2 shows a schematic cross-sectional view of pneumatic device PD1 taken along line A-A of FIG. 1. As can be seen, first seam S1 connects first foil L1, second foil L2 and third foil L3 to one another whereas overflow connection seam OFCS only connects second foil L2 and third foil L3 to one another. As a result, in the region of overflow connection seam OFCS an overflow opening OF is created between first foil L1 and second foil L2. As a consequence, pressurized fluid such as pressurized air within fluid supply passage FSP can flow into first fluid chamber FC1 via overflow opening OF.

As can be further seen in FIG. 2, a connection passage CP is formed within second foil L2. In the exemplary embodiment shown in FIG. 2, connection passage CP is an opening such as a hole formed in second foil L2. Connection passage CP is configured to fluidly connect first fluid chamber FC1 with second fluid chamber FC2. Thus, pressurized fluid entering first fluid chamber FC1 via overflow opening OF can flow into second fluid chamber FC2 via connection passage CP.

In FIG. 2, second fluid chamber FC2 is shown in an inflated state. This is illustrated by a dome-like shape of third foil L3. When pressurized fluid is provided to second fluid chamber FC2 (via connection passage CP), second fluid chamber FC2 is inflated producing the dome-like shape as shown. In the inflated state of second fluid chamber FC2, second fluid chamber FC2 substantially extends along a fluid chamber axis FCA which itself extends along an inflation direction ID of second fluid chamber FC2. Moreover, connection passage CP extends along a connection passage axis CPA which itself extends parallel to fluid chamber axis FCA. In the particular embodiment shown, fluid chamber axis FCA and connection passage axis CPA extends along a common axis.

Figure 4A:
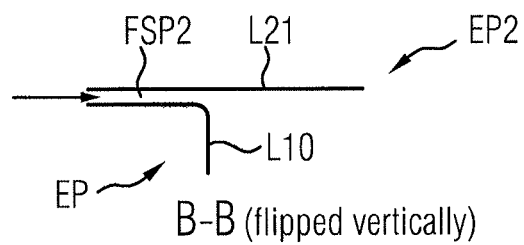
FIGS. 4A-4D illustrate schematic manufacturing steps for manufacturing a second embodiment of a pneumatic device according to an aspect of the invention.
Figure 4A:
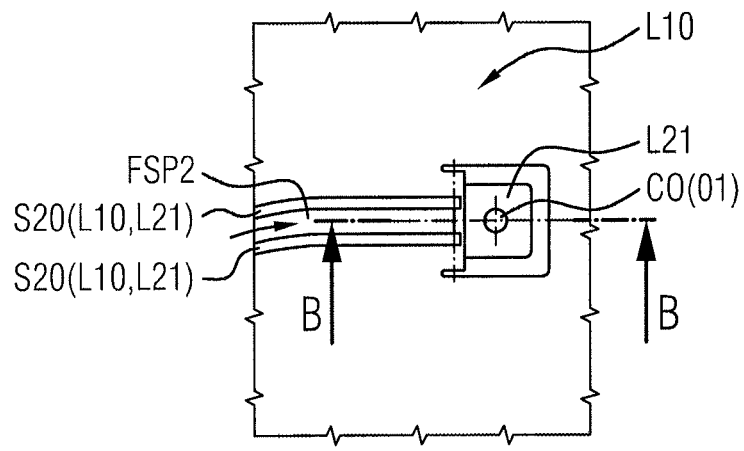
Figure 4B:
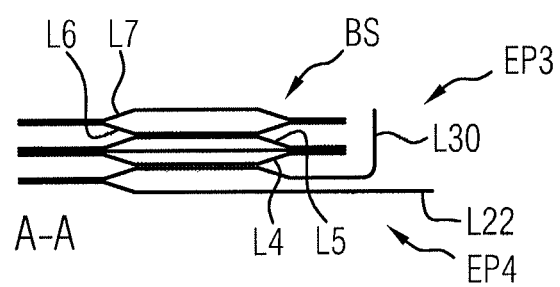
Figure 4B:
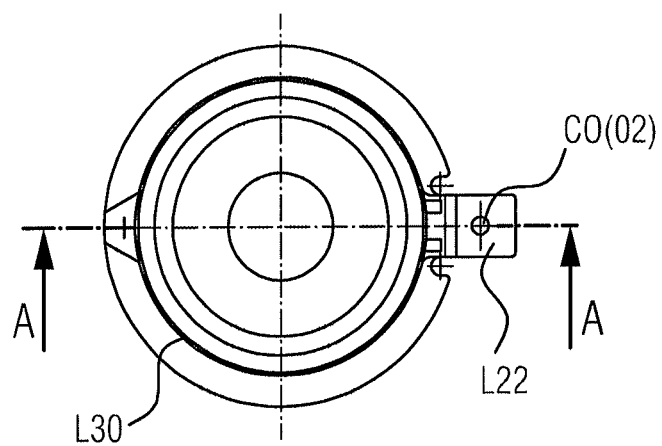
Figure 4C:
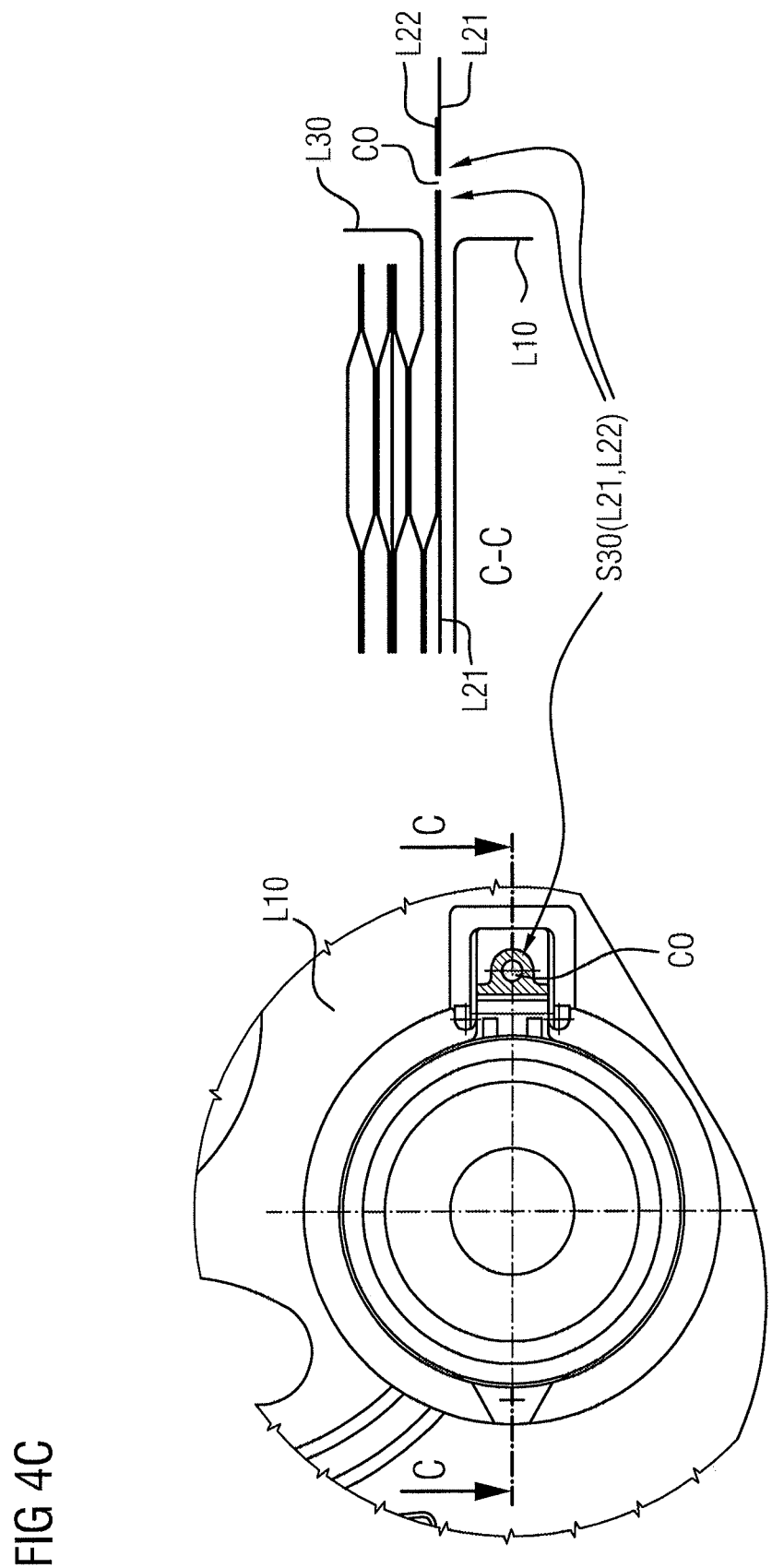
Figure 4D:
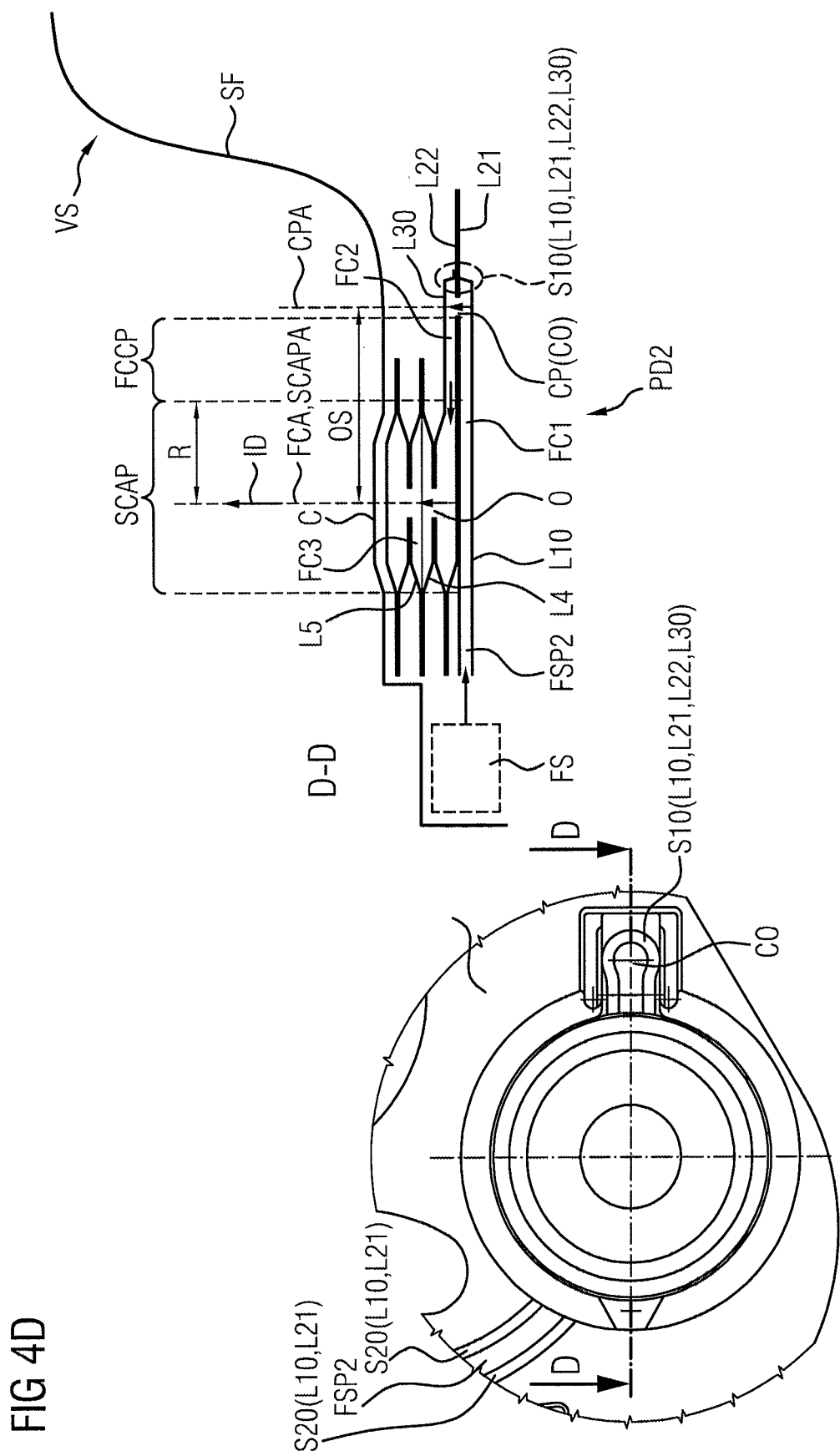
Figure 5A:
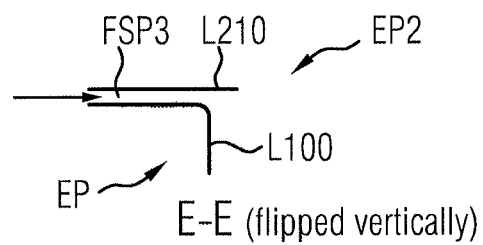
FIGS. 5A-5D illustrate schematic manufacturing steps for manufacturing a third embodiment of a pneumatic device according to an aspect of the invention.
Figure 5A:
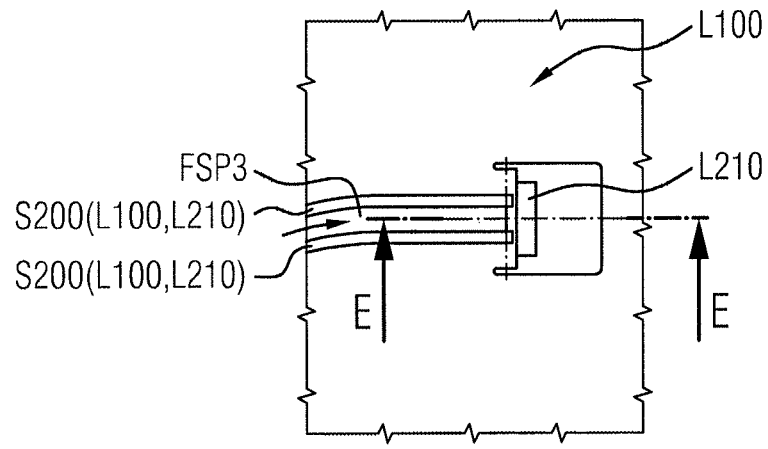
Figure 5B:
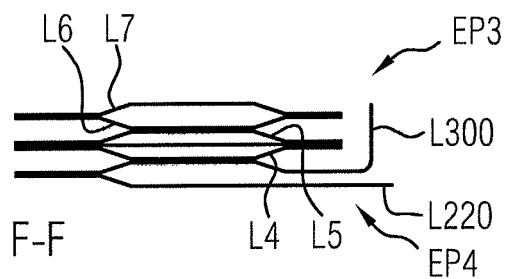
Figure 5B:
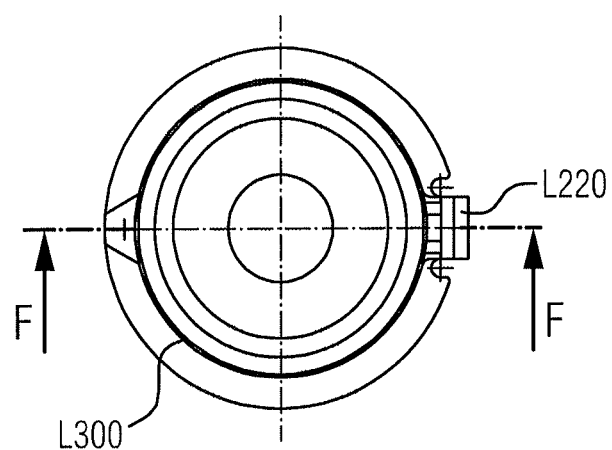
Figure 5C:
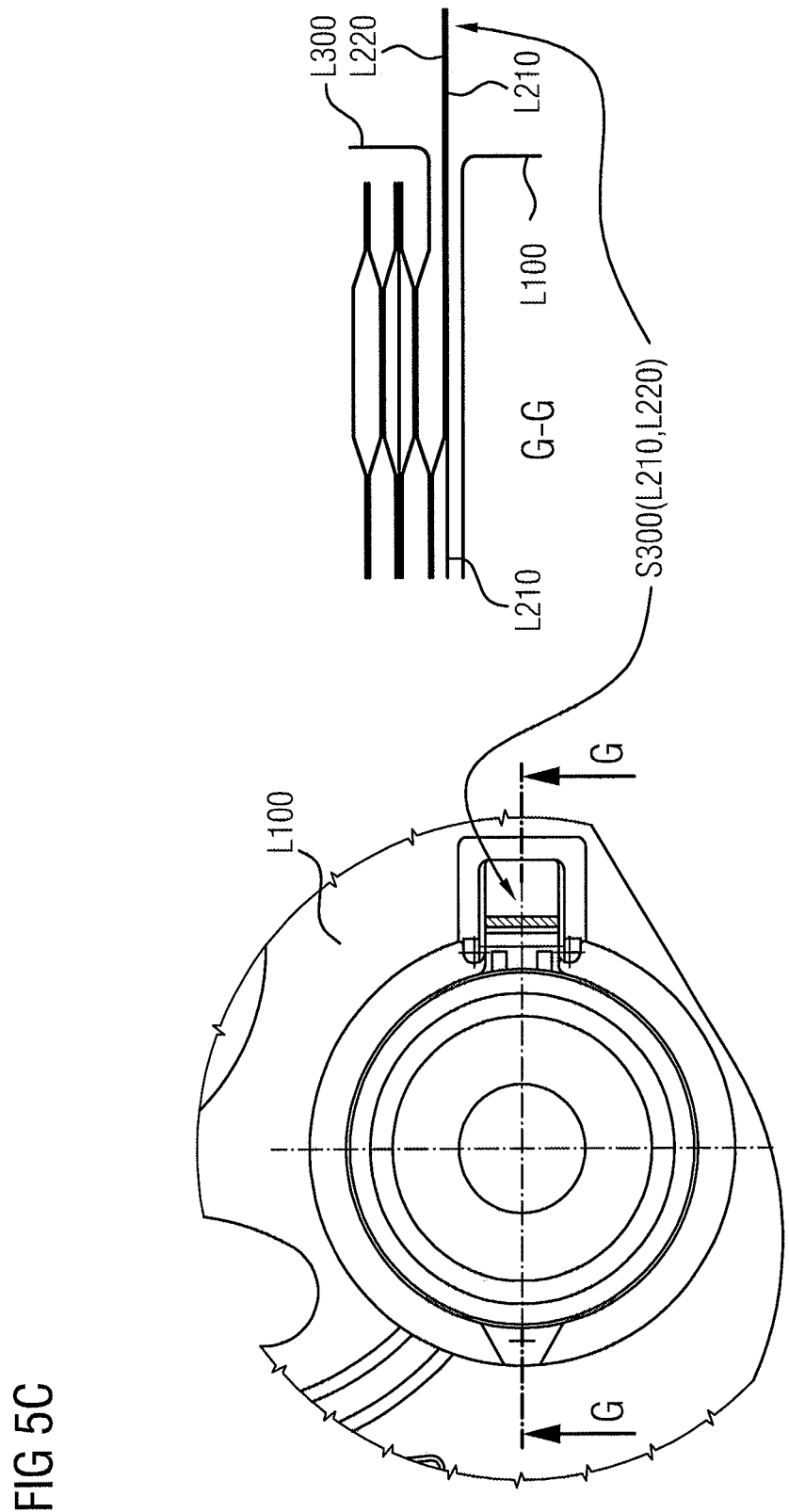
Figure 5D:
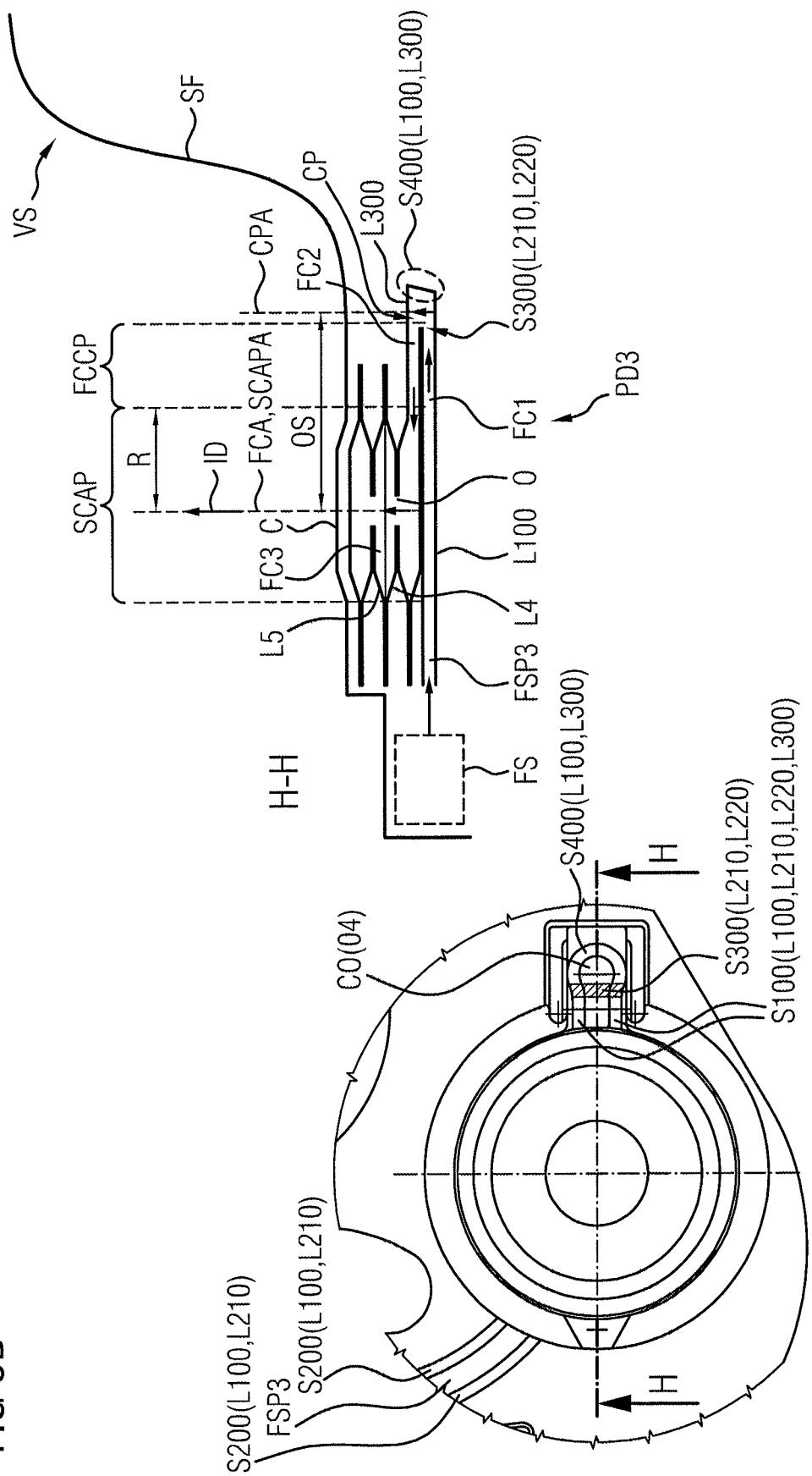

As will become clearer in connection with FIGS. 4D and 5D, when inflation direction ID is arranged towards a seating face SF of a vehicle seat VS, an inflation of second fluid chamber FC2 can be used to adjust a contour C of the seating face SF of the vehicle seat VS in the region of second fluid chamber FC2.

Referring now FIGS. 3A-3E, schematic manufacturing steps for manufacturing pneumatic device PD1 are shown.

Figure 3A:
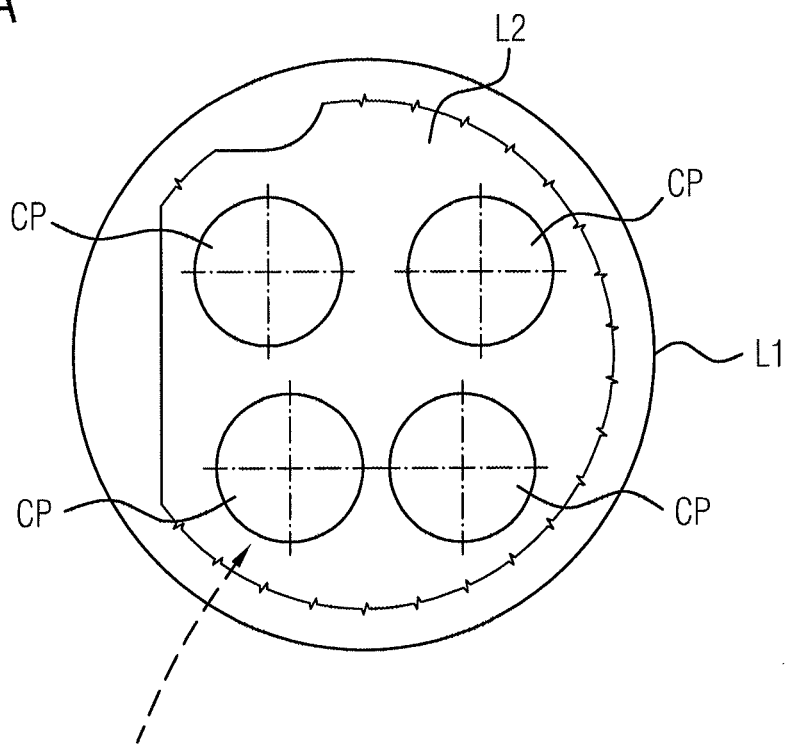

As can be seen in FIG. 3A, first foil L1 and second foil L2 are provided. Second foil L2 may be provided with connection passage CP already formed within second foil L2. Alternatively, connection passage CP may be formed within second foil L2 in a separate manufacturing step. Connection passage CP may be formed, for example, by stamping an opening out of second foil L2.

Figure 3B:
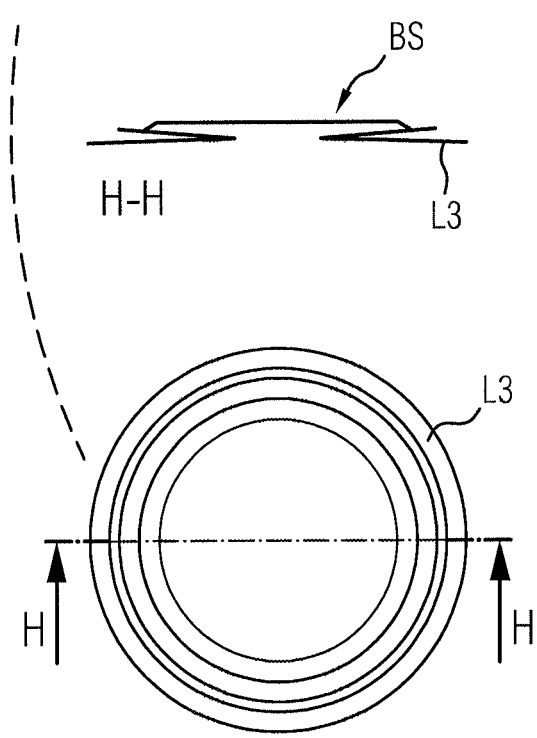

Referring now to FIG. 3B, third foil L3 is shown in a top view as well as in a cross sectional view taken along line H-H of the top view. As can be seen, in the particular embodiment shown, third foil L3 includes a bellow shape BS which is particularly suitable for producing the dome-like-shape mentioned before. However, in other embodiments, third foil L3 may not include the bellow shape BS but may include a flat shape also suitable for producing the dome-like shape.

Figure 3C:
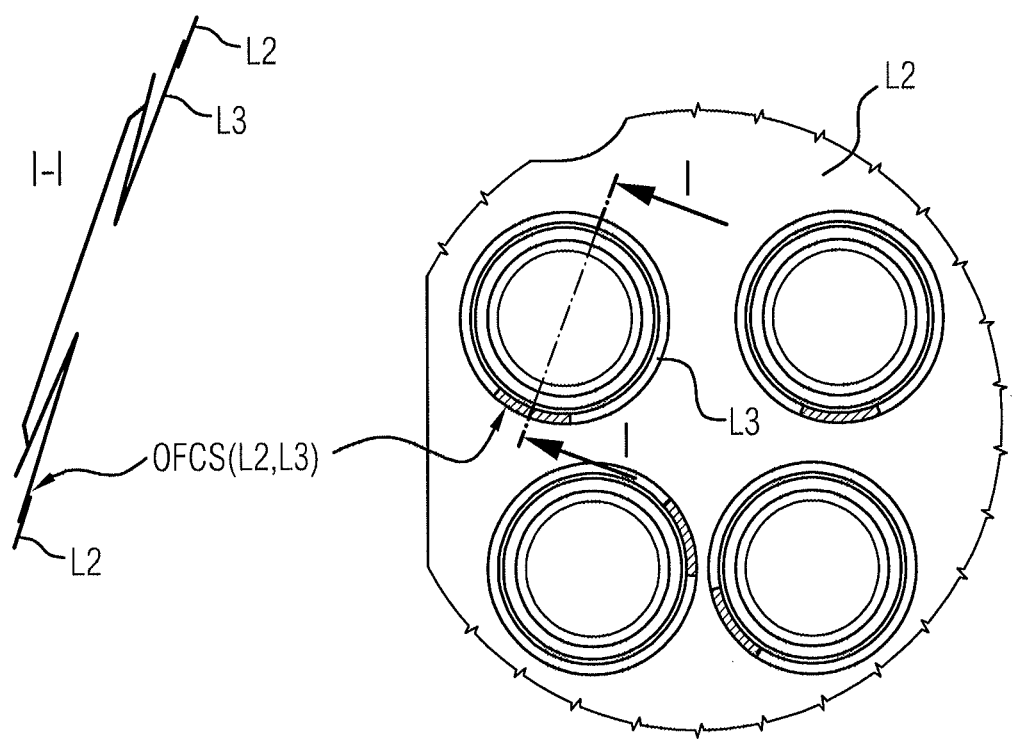

Referring now to FIG. 3C, third foil L3 and second foil L2 are connected to one another by overflow connection seam OFCS. As already mentioned in connection with FIG. 2, by connecting only third foil L3 and second foil L2 to one another, an overflow opening OF between second foil L2 and first foil L1 in the region of overflow connection seam OFCS is created.

Figure 3D:
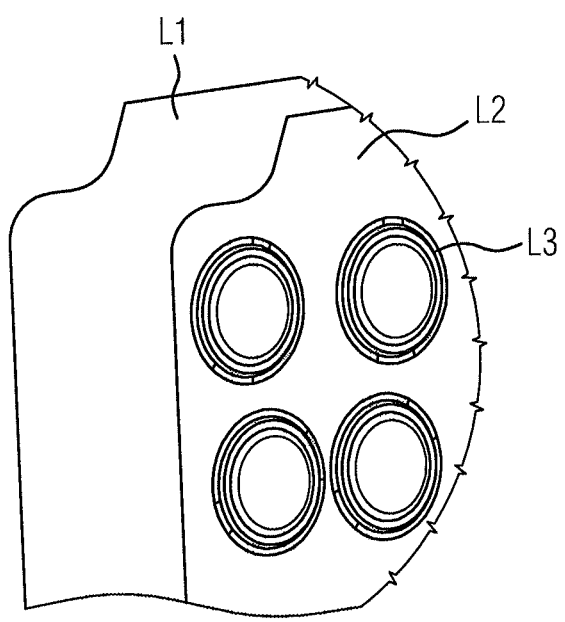

Referring now to FIG. 3D, second foil L2 (together with third foil L3) is arranged on first foil L1.

Referring now to FIG. 3E, first foil L1, second foil L2 and third foil L3 are connected to one another by first seam 1. Moreover, only second foil L2 and first foil L1 are connected to one another by second seam S2 arranged adjacent first seam S1 such that fluid supply passage FSP is formed between first foil L1 and second foil L2. First seam S1 and second seam S2 are further arranged such that pressurized fluid can flow from fluid supply passage FSP into first fluid chamber FC1 via overflow opening OF formed between first foil L1 and second foil L2 underneath overflow connection seam OFCS. As a result, pressurized fluid can flow from fluid supply passage FSP into first fluid chamber FC1 and from there into second fluid chamber FC2 via connection passage CP.

Referring now to FIGS. 4A-4D, schematic manufacturing steps for manufacturing a second embodiment of a pneumatic device PD2 are illustrated. In this embodiment, a second foil L20 for producing pneumatic device PD2 includes a lower foil L21 and an upper foil L22. Thus, compared to pneumatic device PD1 which is produced by using three foils (L1-L3), pneumatic device PD2 is produced by using four foils (L10, L21, L22, L30).

Referring now to FIG. 4A, lower foil L21 of second foil L20 is arranged on a first foil L10. First foil L10 and lower foil L21 are further connected to one another by a second seam S20 such that a fluid supply passage FSP2 between first foil L10 and lower foil L21 is formed. In this respect, a fluid distributor is formed which is able to distribute pressurized fluid via fluid supply passage FSP2. As can be also seen in FIG. 4A, an end portion EP of first foil L10 is bent such that an end portion EP2 of lower foil L21 protrudes from end portion EP of first foil L10. In addition, a first opening O1 is formed in end portion EP2 of lower foil L21.

Referring to FIG. 4B, a third foil L30 is arranged on upper foil L22 of second foil L20. In this respect, a fluid cell or chamber is formed which is able to receive pressurized fluid from the fluid distributor (FIG. 4A). In the particular embodiment shown, third foil L30 is connected to further foils (L4, L5, L6, L7) for providing a bellow shape BS. It should be noted though, that in other embodiments, third foil L30 may not be connected to further foils (L4-L7) and may not have the bellow shape BS but, for example, a straight shape.

As can be further seen, an end portion EP3 of third foil L30 is bent such that an end portion EP4 of upper foil L22 protrudes from end portion EP3 of third foil L30. In addition, a second opening O2 is formed in end portion EP4 of upper foil L22.

Referring now to FIG. 4C, the fluid distributor (FIG. 4A) and the fluid cell (FIG. 4B) are connected to one another. This is done by arranging upper foil L22 on lower foil L21 such that second opening O2 is arranged on first opening O1. Next, a third seam S30 which only connects lower foil L21 and upper foil L22 to one another is provided circumferentially around first opening O1 and second opening O2 so that first opening O1 and second opening O2 together form a common opening CO within upper foil L22 and lower foil L21.

Referring now to FIG. 4D, first foil L10, lower foil L21, upper foil L22 and third foil L30 are connected to one another by a first seam S10 which extends circumferentially around third seam S30. As a result, common opening CO in lower foil L21 and upper foil L22 is configured as a connection passage CP which fluidly connects first fluid chamber FC1 (between first foil L10 and lower foil L21) with second fluid chamber FC2 (between upper foil L22 and third foil L30).

As can be further seen in FIG. 4D, in the inflated state of second fluid chamber FC2, second fluid chamber FC2 includes a seat contour adjustment portion SCAP which is configured to adjust a contour C of a seating face SF of a vehicle seat VS, and a fluid chamber coupling portion FCCP which fluidly connects connection passage CP to seat contour adjustment portion SCAP. Seat contour adjustment portion SCAP extends along a seat contour adjustment portion axis SCAPA which itself extends along an inflation direction ID of second fluid chamber FC2. In addition, connection passage CP extends along a connection passage axis CPA which extends at a predetermined offset OS to seat contour adjustment portion axis SCAPA. The offset OS between seat contour adjustment portion axis SCAPA and connection passage axis CPA is chosen to be larger than a maximal radius R (measured perpendicular to inflation direction ID or seat contour adjustment portion axis SCAPA) of seat contour adjustment portion SCAP. As a result, connection passage CP is arranged offset to seat contour adjustment portion SCAP so that an influence on connection passage CP during inflation of second fluid chamber FC2 can be reduced.

As already mentioned in connection with FIG. 4B, third foil L30 may be connected to one or more further foils (L4 to L7). In these embodiments, as can be seen in FIG. 4D, third foil L30 includes an opening O. Opening O provides a fluid passage between second fluid chamber FC2 and a third fluid chamber FC3 formed by connecting one or more further foils (such as foils L4 and L5) to third foil L30. By providing a third fluid chamber FC3 in addition to second fluid chamber FC2, an adjustment of the contour C of the seating face SF can be increased.

Referring now to FIGS. 5A-5D, schematic manufacturing steps for manufacturing a third embodiment of a pneumatic device PD3 are illustrated. In this embodiment, a second foil L200 includes a lower foil L210 and an upper foil L220. But compared to pneumatic device PD2, connection passage CP is not formed as a common opening CO within upper foil L210 and lower foil L220 but as a space between two seams, as will be explained later.

Referring now to FIG. 5A, lower foil L210 of second foil L200 is arranged on a first foil L100. First foil L100 and lower foil L210 are further connected to one another by a second seam S200 such that a fluid supply passage FSP3 is formed. Thus, again a fluid distributor is formed which is able to distribute pressurized fluid via fluid supply passage FSP3. As can be also seen in FIG. 5A, an end portion EP of first foil L100 is bent such that an end portion EP2 of lower foil L210 protrudes from end portion EP of first foil L100.

Referring to FIG. 5B, third foil L300 is arranged on upper foil L220. Thus, again a fluid cell or chamber is formed which is able to receive pressurized fluid from the fluid distributor. In the particular embodiment shown, third foil L300 is connected to further foils (L4, L5, L6, L7) for providing a bellow shape BS. Again, it should be noted that in other embodiments, third foil L300 may not be connected to further foils (L4-L7) and my not have the bellow shape BS but may, for example, have a straight shape.

As can be further seen, an end portion EP3 of third foil L300 is bent such that an end portion EP4 of upper foil L220 protrudes from end portion EP3 of third foil 300.

Referring now to FIG. 5C, the fluid distributor (FIG. 5A) and the fluid cell (FIG. 5B) are connected to one another. This is done by arranging upper foil L220 on lower foil L210 such that end portion EP4 of upper foil L210 and end portion EP2 of lower foil L220 are arranged on top of each other. Next, only lower foil L210 and upper foil L220 are connected to one another by a third seam S300. More precisely, end portion EP4 of upper foil L220 and end portion EP2 of lower foil L210 are connected by third seam S300.

Referring now to FIG. 5D, first foil L100, lower foil L210, upper foil L220 and third foil L300 are connected to one another by a first seam S100. In addition, only first foil L100 and third foil L300 are connected by a fourth seam S400 which is arranged offset to third seam S300. As a result, an opening O4 is produced between third seam S300 and fourth seam S400 and is configured as the connection passage CP which fluidly connects first fluid chamber FC1 (between first foil L100 and lower foil L210) with second fluid chamber FC2 (between upper foil L220 and third foil L300).

As also shown in FIG. 5D, in the inflated state of second fluid chamber FC2, second fluid chamber FC2 includes a seat contour adjustment portion SCAP which is configured to adjust a contour C of a seating face SF of a vehicle seat VS, and a fluid chamber coupling portion FCCP which fluidly connects connection passage CP to seat contour adjustment portion SCAP. Seat contour adjustment portion SCAP also extends along a seat contour adjustment portion axis SCAPA which itself extends along an inflation direction ID of second fluid chamber FC2. In addition, connection passage CP extends along a connection passage axis CPA which extends at a predetermined offset OS to seat contour adjustment portion axis SCAPA. The offset OS between seat contour adjustment portion axis SCAPA and connection passage axis CPA is chosen to be larger than a maximal radius R (measured perpendicular to inflation direction ID or seat contour adjustment portion axis SCAPA) of seat contour adjustment portion SCAP. As a result, connection passage CP is arranged offset to seat contour adjustment portion SCAP and an influence on connection passage CP during inflation of second fluid chamber FC2 can be reduced.

As already mentioned in connection with FIG. 5B, third foil L300 may be connected to one or more further foils (L4 to L7). As shown in FIG. 5D, third foil L300 includes an opening O which provides a fluid passage between second fluid chamber FC2 and a third fluid chamber FC3 which is formed by connecting one or more further foils (such as foils L4 and L5) to third foil L300. By providing a third fluid chamber FC3 in addition to second fluid chamber FC2, an adjustment of contour C of seating face SF of vehicle seat VS can be increased.

It should be noted that first seam S1, S10, S100, second seam S2, S20, S200, overflow connection seam OFCS, third seam S30, S300, and fourth seam S400 or any further seams may be provided by welding techniques such as high frequency welding.

Figure 6:
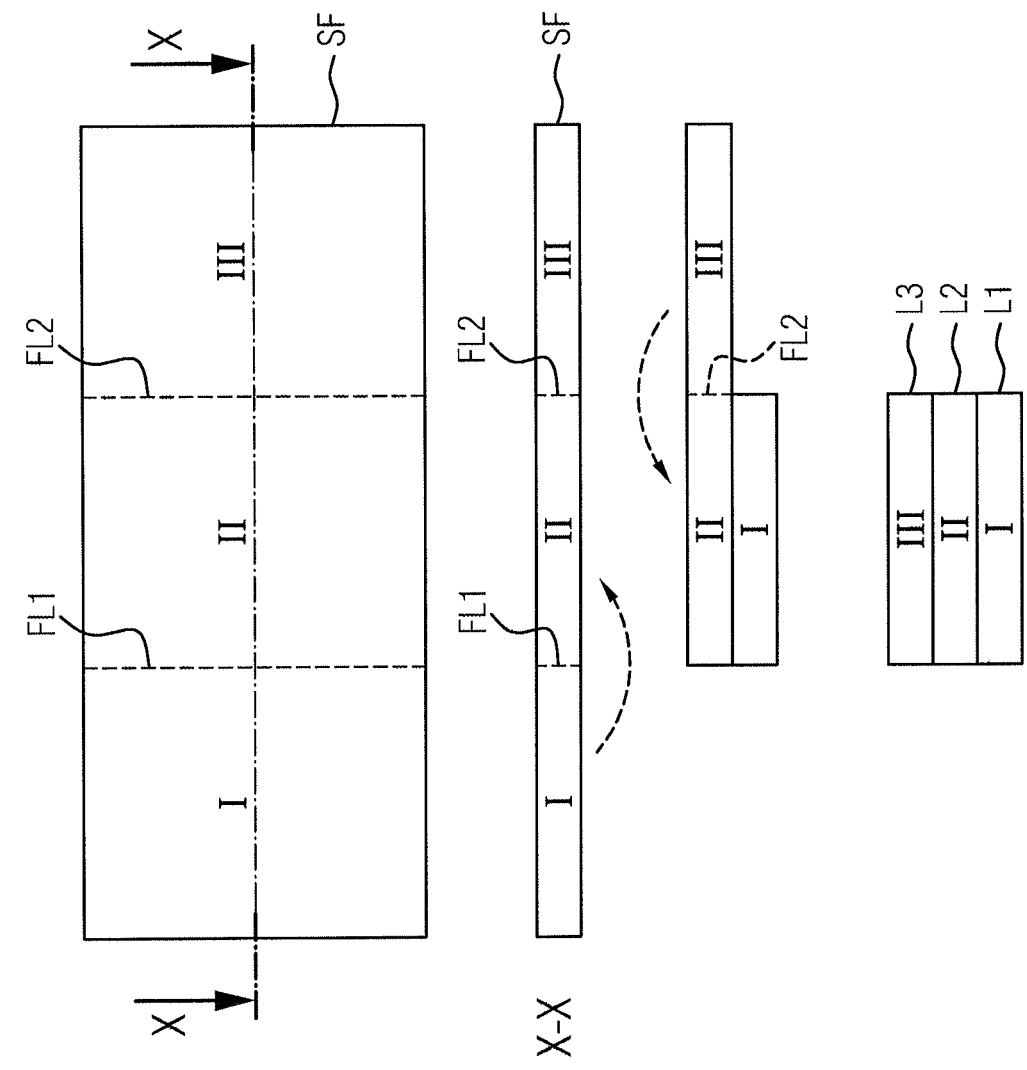
FIG. 6 illustrates a manufacturing step for providing three separate foils.

Referring now to FIG. 6, an alternative processing step for providing first foil L1, L10, L100, second foil L2, L20, L200 and third foil L3, L30, L300 is shown. Instead of providing first foil L1, L10, L100, second foil L2, L20, L200 and third foil L3, L30, L300 as three separate foils, a single foil SF having a first section I, a second section II and a third section III may be provided. Moreover, single foil SF may be folded along a first folding line FL1 and a second folding line FL2 such that the second section II lies on the first section I and such that the third section III lies on the second section II.

It should be noted that although only the second fluid chamber FC2 was explained to adjust the contour C of the seating face SF of the vehicle VS, it is in principle also conceivable that instead of or in addition to the second fluid chamber FC2 the first fluid chamber FC1 is configured to adjust the contour C of the seating face SF of the vehicle seat VS.

The invention claimed is:

1. A pneumatic device for adjusting a contour of a seating face of a vehicle seat, the pneumatic device comprising:
   a first foil;
   a second foil arranged on the first foil;
   a third foil arranged on the second foil;
   a first seam connecting the first foil, the second foil and the third foil to one another, wherein the first seam is configured to provide a first fluid chamber between the first foil and the second foil, wherein the first seam is further configured to provide a second fluid chamber between the second foil and the third foil, and wherein at least one of the first fluid chamber or the second fluid chamber are configured to adjust the contour of the seating face of the vehicle seat; and
   a connection passage formed in the second foil and configured to fluidly connect the first fluid chamber with the second fluid chamber.

2. The pneumatic device of claim 1, further comprising:
   a second seam connecting only the first foil and the second foil to one another, wherein the second seam is configured to provide a fluid supply passage between the first foil and the second foil to fluidly connect the first fluid chamber with a fluid source of the pneumatic device.

3. The pneumatic device of claim 2, wherein, in an inflated state of the second fluid chamber, the second fluid chamber substantially extends along a fluid chamber axis extending along an inflation direction of the second fluid chamber, and the connection passage extends through the second foil along a connection passage axis extending substantially parallel to the fluid chamber axis.

4. The pneumatic device of claim 1, wherein, in an inflated state of the second fluid chamber, the second fluid chamber substantially extends along a fluid chamber axis extending along an inflation direction of the second fluid chamber, and the connection passage extends through the second foil along a connection passage axis extending substantially parallel to the fluid chamber axis.

5. The pneumatic device of claim 4, wherein the connection passage axis and the fluid chamber axis extend along a common axis.

6. The pneumatic device of claim 1, wherein, in the inflated state of the second fluid chamber, the second fluid chamber includes a seat contour adjustment portion configured to adjust the contour of the seating face of the vehicle seat and a fluid chamber coupling portion configured to fluidly connect the connection passage to the seat contour adjustment portion.

7. The pneumatic device of claim 6, wherein
   the seat contour adjustment portion extends along a seat contour adjustment portion axis,
   the connection passage extends along a connection passage axis,
   the connection passage axis extends at a predetermined offset to the seat contour adjustment portion axis, and
   the predetermined offset is chosen to be larger than a maximal radius of the seat contour adjustment portion.

8. The pneumatic device claim 1, wherein
   the second foil comprises a lower foil and an upper foil arranged on the lower foil,
   the lower foil and the upper foil include a common opening,
   only the lower foil and the upper foil are connected to one another by a third seam extending circumferentially around the common opening; and
   the lower foil, the upper foil, the first foil and the third foil are connected to one another by the first seam which is at least partially around the third seam along a circumference thereof.

9. The pneumatic device of claim 1, wherein
   the second foil comprises a lower foil and an upper foil arranged on the lower foil,
   the lower foil, the upper foil, the first foil and the third foil are connected to one another by the first seam, only the lower foil and the upper foil are connected to one another by a third seam arranged adjacent the first seam, and only the first foil and the third foil are connected to one another by a fourth seam arranged offset to the third seam such that an opening extending between the third seam and the fourth seam is provided and configured as the connection passage.

10. The pneumatic device of claim 1, wherein the third foil includes an opening in a region of the second fluid chamber and the opening is configured to provide a fluid passage between the second fluid chamber and a third fluid chamber formed by connecting a further foil to the third foil.

11. A vehicle seat, comprising:
a seating face for a user of the vehicle seat; and
a pneumatic device of claim 1 configured to adjust the seating face.

12. A method for manufacturing a pneumatic device for adjusting a contour of a seating face of a vehicle seat, the method comprising:
providing a first foil;
providing a second foil formed with a connection passage;
providing a third foil;
arranging the second foil on the first foil;
arranging the third foil on the second foil; and
connecting the first foil, the second foil and the third foil to one another by a first seam such that a first fluid chamber is formed between the first foil and the second foil, such that a second fluid chamber is formed between the second foil and the third foil and such that the first fluid chamber and the second fluid chamber are fluidly connected to one another by the connection passage.

13. The method of claim 12, wherein providing the second foil formed with the connection passage further comprises:
providing the second foil; and
forming the connection passage inside the second foil.

14. The method of claim 13, wherein providing the first foil, providing the second foil and providing the third foil include:
providing a single foil with a first section, a second section and a third section; and
folding the single foil along a first folding line and a second folding line such that the second section lies on the first section and such that the third section lies on the second section.

15. The method of claim 13, further comprising:
connecting only the first foil and the second foil to one another by a second seam such that a fluid supply passage between the first foil and the second foil is formed.

16. The method of claim 12, further comprising:
connecting only the first foil and the second foil to one another by a second seam such that a fluid supply passage between the first foil and the second foil is formed.

17. The method of claim 12, wherein the second foil includes a lower foil and an upper foil and the step of providing the second foil formed with the connection passage further comprises:
arranging the upper foil on the lower foil;
forming a common opening in the upper foil and the lower foil; and
connecting only the upper foil and the lower foil to one another by a third seam extending circumferentially around the common opening.

18. The method of claim 17, wherein the connecting the first foil, the second foil and the third foil to one another further comprises:
connecting the first foil, the lower foil, the upper foil and the third foil to one another by the first seam such that the first seam is at least partially around the third seam along a circumference thereof.

19. The method of claim 12, wherein the second foil includes a lower foil and an upper foil and the step of providing the second foil formed with the connection passage further comprises:
arranging the upper foil on the lower foil;
connecting only the upper foil and the lower foil to one another by a third seam; and
connecting only the first foil and the third foil to one another by a fourth seam arranged offset to the third seam such that an opening extending between the third seam and the fourth seam is configured as the connection passage.

* * * * *